United States Patent [19]

Vereyken

[11] 4,026,571
[45] May 31, 1977

[54] BICYCLE WITH REAR MOUNTED CRANK ARMS AND IMPROVED CHAIN CONTROL UNIT

[76] Inventor: Franciscus A. Vereyken, 4321 Norwalk Drive No. 206, San Jose, Calif. 95129

[22] Filed: Apr. 16, 1975

[21] Appl. No.: 567,321

[52] U.S. Cl. .............................................. 280/251
[51] Int. Cl.² ........................................ B62M 1/04
[58] Field of Search .......... 280/251, 243, 253, 255, 280/254

[56] References Cited

UNITED STATES PATENTS

| | | | |
|---|---|---|---|
| 556,545 | 3/1896 | Ljungstrom | 280/251 |
| 636,184 | 10/1899 | Roxendorff | 280/251 X |
| 3,834,733 | 9/1974 | Harris | 280/251 |
| 3,889,974 | 6/1975 | Kallander | 280/251 |
| 3,954,282 | 5/1976 | Hege | 280/251 |

FOREIGN PATENTS OR APPLICATIONS

| | | | |
|---|---|---|---|
| 432,826 | 10/1911 | France | 280/251 |
| 43,737 | 3/1938 | Netherlands | 280/251 |
| 18,439 | 1900 | United Kingdom | 280/251 |

*Primary Examiner*—Kenneth H. Betts
*Attorney, Agent, or Firm*—Townsend and Townsend

[57] ABSTRACT

An improved chain control unit for a bicycle of the type having a pair of crank arms rotatably mounted at their rear ends on a mount secured to the frame of the bicycle behind the rear wheel thereof. Thus, pedals on the front ends of the crank arms are driven up and down by upward and downward movements of the legs. The chain control unit includes a follower for each crank arm, respectively, each follower operating to change the angular relationship between a pair of adjacent stretches of the chain in a manner to progressively increase the angular travel of a sprocket at the hub of the rear wheel in response to uniform angular, downward travel of the corresponding crank arm to thereby provide for optimum torque applied to the rear wheel. Several embodiments of the chain control unit are disclosed including one having an overriding feature operated by a manually actuated control device carried on the handlebar or other suitable location.

17 Claims, 15 Drawing Figures

BICYCLE WITH REAR MOUNTED CRANK ARMS AND IMPROVED CHAIN CONTROL UNIT

This invention relates to improvements in bicycles and, more particularly, to an improved chain control mechanism for a bicycle.

BACKGROUND OF THE INVENTION

The present invention relates to an improved control unit for a bicycle of the type having rear mounted, leg actuated crank arms instead of the conventional rotary crank arms mounted on a sprocket between the front and rear wheels of standard bicycles. Specifically, the invention relates to the control of the torque applied to the rear wheel of such a bicycle.

Bicycles of this type have been known in the past and have been disclosed in certain foreign patents including Dutch Pat. No. 43,737 and French Pat. No. 432,826, and in an article in the October 1973 issue of *Bicycling* entitled "The Harris Vertical Bicycle".

The essence of this type of bicycle is that its rear wheel is driven alternately by a cable or chain moved back and forth by up and down movements of a pair of crank arms rotatably mounted on the bicycle frame behind the rear wheel. Sprockets on opposite sides of the hub of the rear wheel are coupled to the chain and are rotated thereby to drive the rear wheel in a forward direction. The sprockets are attached to a one-way clutch or ratchet mechanism so that each sprocket drives the rear wheel in the forward direction of rotation but is free-wheeling in the reverse direction. Moreover, when one crank arm is pulled downwardly the other crank arm is pulled upwardly by the action of the chain. Thus, the rider can drive the bicycle forwardly by continuous up and down leg movements with the feet on pedals at the front ends of the crank arms.

The prior art bicycles of this type generally provide a one-to-one relationship between the rotation of the two sprockets on the rear wheel hub and the up and down movements of the crank arms. This means that, for unit angular displacement of each crank arm, there will be a corresponding unit angular displacement of the corresponding sprocket for all operative positions of the crank arm. While this relationship is adequate for certain purposes, it is not especially desirable for other purposes, such as those cases where it is desired to obtain increased torque applied to the rear wheel for greater downward displacement of the crank arms. A need has, therefore, arisen for a control means for increasing this torque as a function of the displacement of the crank arms.

SUMMARY OF THE INVENTION

The present invention is directed to an improved control unit for a bicycle of the above type which satisfies the aforesaid needs, specifically for increasing the torque delivered to the rear wheel sprockets as a function of the displacement of the rear-mounted crank arms of the bicycle. Thus, the torque can be increased as desired or needed by merely increasing the stroke of the crank arms. Where torque is not required, the stroke of the crank arms can be kept at a minimum so as to permit minimum exertion of effort on the part of the bicycle rider.

To achieve the foregoing aim, the control unit of this invention utilizes a pair of shiftable followers which move along a pair of inclined frame members extending rearwardly from the hub of the rear wheel. These followers operate to alternately change the angular relationship of a pair of stretches of the chain or cable which is coupled to the sprockets on the hub of the rear wheel. This change in angular relationship is such that the sprockets are alternately rotated through greater angular distances as the displacement of their respective crank arms is increased. By increasing the angular distance of rotation of each sprocket, greater torque is applied to the hub of the wheels and more work is obtained either in the form of greater speed or maintaining a constant speed, such as going up a hill.

In two embodiments of the invention, the followers are coupled to the chain and move alternately upwardly and downwardly with the downward and upward movements of respective crank arms. During each upward travel or movement, the follower causes the two chain stretches to approach each other relatively so that, while greater force is required on the legs to continue downward movement of the corresponding crank arm, this downward movement and continued force is provided by the leg when the leg is almost straight rather than flexed as in the case of conventional bicycles. Thus, the bicycle is much more efficient than bicycles of this type without the improved chain control unit.

In a third embodiment, the followers are generally stationary but can be moved to different operative positions by manually controlling an actuator carried by the chain. Thus, the change in position of the followers can thereby be made responsive to angular displacements of the crank arms.

The primary object of this invention is to provide an improved bicycle of the type having rear mounted crank arms wherein the bicycle has an improved chain control unit coupled to the hub sprockets on one of the wheels thereof and to the crank arms so that increased torque can be applied to the wheels in response to downward movements of the crank arms so as to provide greater control of the speed and work applied to operate the bicycle.

Another object of this invention is to provide an improved chain control unit of the type described wherein the unit utilizes a pair of chain followers for changing the angular relationship between a pair of chain stretches on each side of the rear wheel, respectively, so as to increase the torque applied to the sprockets on the wheel hub as a function of the displacement of the crank arms themselves.

Other objects of this invention will become apparent as the following specification progresses, reference being had to the accompanying drawings for an illustration of several embodiments of the invention.

A first embodiment of the present invention is illustrated in FIGS. 1–4 and relates to a bicycle 10 have a frame 12 and rotatable front and rear wheels 14 and 16. The front wheel is mounted conventionally by a standard fork 18, and rear wheel 16 is mounted for rotation on and is disposed between a pair of spaced, rearwardly extending, inclined frame members 22, only one member 22 being shown in FIG. 1. Frame 12 further includes a second pair of spaced rearwardly extending, inclined frame members 24 which converge to respective members 22 as the rear ends thereof are approached. Members 22 and 24 are welded or otherwise rigidly secured to a cylindrical tube 26 (FIGS. 1 and 2) having an axis parallel to the central axis of rear wheel 16. Tube 26 is adapted to mount a pair of crank arms 28 and 30 for up and down rotation about the longitudinal axis of tube 26.

Figure 2:
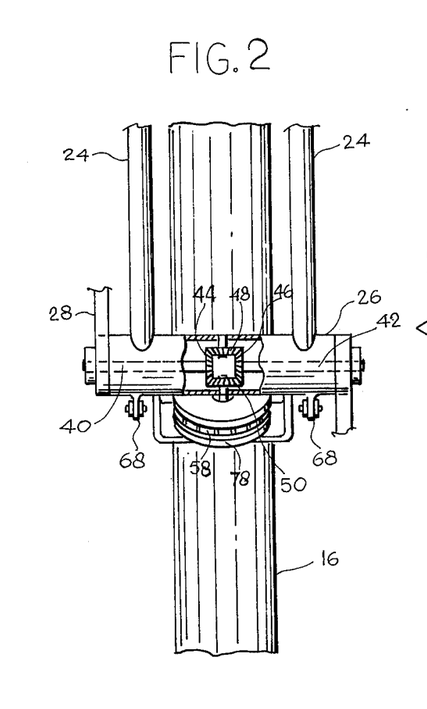
FIG. 2 is an enlarged, fragmentary rear elevational view of the bicycle, showing the mount for the crank arms.

Crank arms 28 and 30 have respective foot pedals 32 and 34 which are adapted to be engaged by the feet of the rider of bicycle 10 when the rider is positioned on seat 36 and grasping handlebar 38 above fork 18. Cranks arms 28 and 30 are mounted on tube 26 in any suitable manner. In a preferred embodiment, crank arms 28 and 30 have respective shafts 40 and 42 provided with beveled gears 44 and 46 within tube 26. Gears 44 and 46 are coupled with a second pair of beveled gears 48 and 50 mounted for rotation in tube 26 as shown in FIG. 2. This gear arrangement assures that, as one crank arm moves in one direction, the other crank arm is caused to move in the opposite direction relative to tube 26. Thus, there will be no movement of the crank arm while the other crank arm is at rest.

Figure 4:
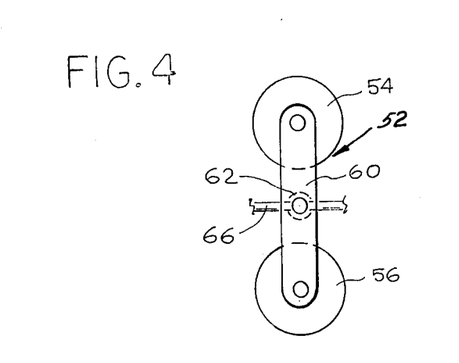
FIGS. 4 and 5 are side and end elevational views, respectively of one of the follower members of the chain control unit.
Figure 5:
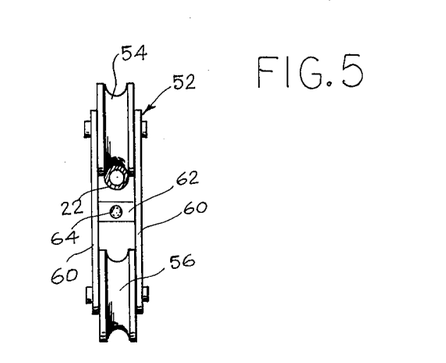

Each of frame members 22 has a follower member 52 of the type shown in FIGS. 4 and 5. Each follower member has an upper roller 54 supported on and movable along member 22, and a lower roller 56 over which a chain, cable or other flexible drive element 58 passes. For purposes of illustration, element 58 will hereinafter be considered a chain.

Rollers 54 and 56 are interconnected by and rotatably mounted on a pair of rigid strips 60. A cylindrical link 62 having a hole 64 therethrough spans the distance between and is connected to strips 60. A cable 66 forming a part of element 58 extends through hole 64 and is movable relative to follower member 52. Cable 66 has a length in the range of 3 to 6 inches and is connected at its ends to respective intermediate ends of chain 58.

Chain 58 is connected at its outer ends to a pair of lugs 68 (FIG. 2) rigid to tube 26 near the ends of the latter. Chain 58 extending away from a first lug 68 passes over the corresponding roller 56 of the respective follower member 52, then down and around a roller pulley or sprocket 70 carried by an ear 72 on the corresponding crank arm 28. The chain then passes upwardly and over a roller, pulley or sprocket 74 connected to rear wheel 16 at the hub thereof. Chain 58 extends rearwardly from the first follower member 52 and about a roller, pulley or sprocket 78 rotatably mounted on the lower part of tube 26 centrally thereof (FIG. 2). The chain then extends forwardly and along the other frame member 22, through the other follower member 52 and about respective rollers, pulleys or sprockets 74 and 70 identical to those described above with respect to FIGS. 1, 4 and 5. The chain is then anchored at its opposite end to the other lug 68 (FIG. 2) on tube 26.

Figure 3:
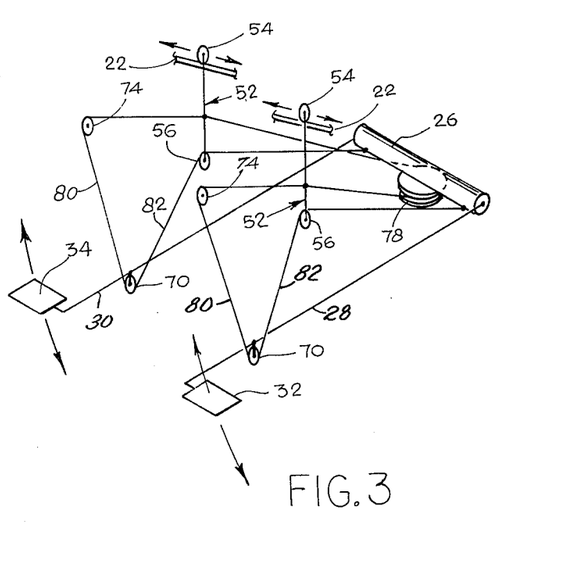
FIG. 3 is a schematic view of the chain control unit of FIG. 1.
Figure 6:
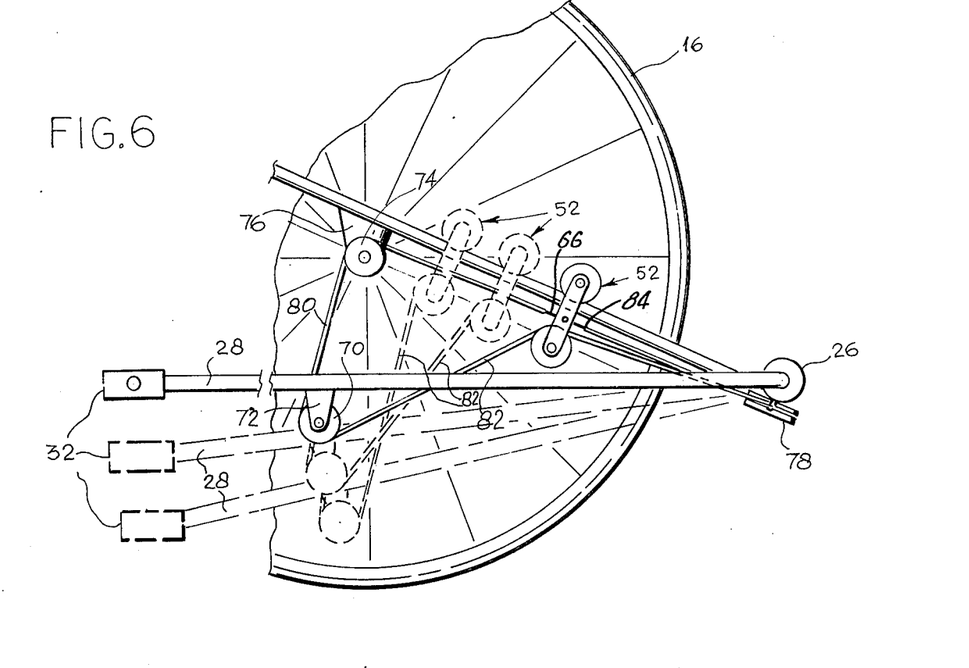
FIG. 6 is an enlarged, fragmentary side elevational view of the rear wheel of the bicycle, showing the chain control unit at several stages of operation thereof.

The chain and crank arm combination is illustrated schematically in FIG. 3. Ordinarily, when crank arm 28 is at its highest operative position, crank arm 30 will be at its lowest operative position. Assuming that crank arm 28 is at an upper position as shown in FIG. 6, the bicycle rider will force downwardly on pedal 32 and this will cause chain 58 to cause rotation of sprocket 74 on the hub of rear wheel 16. Initially, for a certain angular travel of crank arm 28, there will be a one-to-one correlation between the angular distance travelled by arm 28 and the angle of rotation of sprocket 74. The reason for this is that the angle between chain stretches 80 and 82 (FIG. 6) remains the same because the corresponding cable 66 travels through opening 64 of link 62 of the corresponding follower member 52, thereby allowing the follower member to remain stationary on the corresponding frame member 22. This occurs until the intermediate end of the chain at the rear end of cable 66 engages link 62 because the hole 64 is smaller than the transverse dimension of the chain. Thus, continued downward movement or counterclockwise rotation of crank arm 28 relative to frame 12 will cause the corresponding follower member 52 to move upwardly along member 22, thereby changing the angular relationship between stretches 80 and 82 of chain 58 since stretch 82 approaches stretch 80.

As stretch 82 approaches stretch 80, sprocket 74 rotates a progressively greater angular distance for each increment of angular movement of crank arm 28. Moreover, a greater leg force is required to force crank arm 28 downwardly as the crank arm approaches its lower operative position because the tension forces on chain stretches 80 and 82 increase due to stretch 82 becoming more and more vertical.

At the upper position of crank arm 28, the leg of the rider is flexed or bent at the knee and, since there is no change in the angular position initially between stretches 80 and 82, a minimum of leg force is required to create an initial downward movement of crank arm 28 through a limited angular distance. However, as follower member 52 is caused to move upwardly, more force is required but the leg is becoming straighter and, in so doing, will be in a better position to provide the additional force required as crank arm 28 reaches or approaches its lowered position. FIG. 6 shows three different operative positions of follower member 52, two of such positions being shown in dashed lines. As shown in FIG. 6, stretch 82 is nearly vertical and is closest to stretch 80 when crank arm 28 is near or at its lowest operative position.

Figure 1:
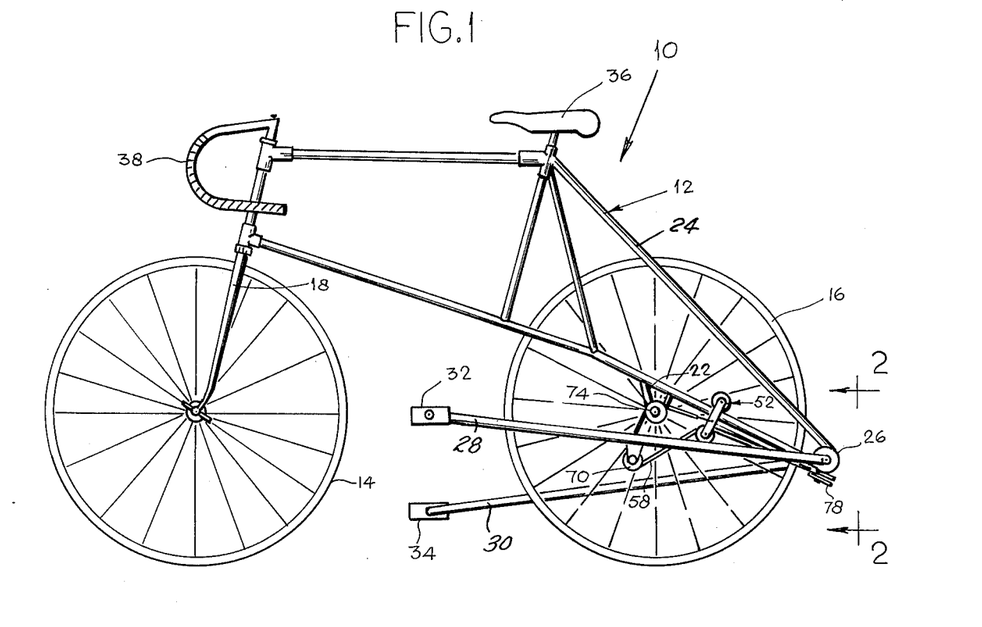
FIG. 1 is a side elevational view of a bicycle of the type having a pair of rotatable, rear mounted crank arms and provided with a first embodiment of a chain control unit coupled to the crank arms.

The net result of the upward movement of follower member 52 and the corresponding approach of stretch 82 toward stretch 80 is that, for each additional increment of angular travel of arm 28, there will be a progressive increase in the angular travel of sprocket 74. What is desired is that there be a maximum rotation of pulley 74 for each increment of angular travel of arm 28 to provide maximum torque to rear wheel 16. The system shown in FIGS. 1, 3 and 6 provides for this feature and, without follower member 52, and the movement thereof along member 22, this feature could not be realized.

While the action of only crank arm 28 has been described, crank arm 30 will move in substantially the same manner to cause its follower member 52 to move forwardly along the corresponding frame member 22 for the reasons described above. When, for instance, crank arm 28 is at its lowest position, crank arm 30 will be at its highest position and the rider will then commence to apply leg force to the pedal of crank arm 30, causing it to descend in the manner described with respect to crank arm 28. The corresponding relations between the chain stretches will be then obtained, causing the sprocket 74 associated with crank arm 30 to rotate and drive rear wheel 16 during downward travel of crank arm 30.

Figure 7:
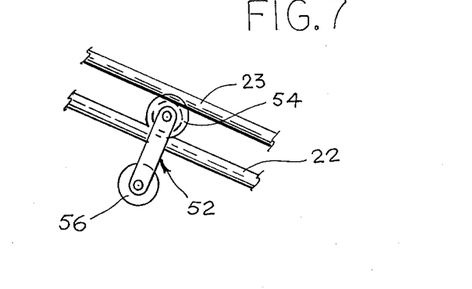
FIG. 7 is an enlarged, fragmentary side elevational view of a modified form of the bicycle frame.

An alternate embodiment of the frame is shown fragmentarily in FIG. 7 wherein a second frame member 23 is provided for each frame member 22, respectively. Each frame member 23 is above and parallel to the corresponding frame member 22, the spacing between adjacent frame members 22 and 23 being such that the upper roller 54 of the corresponding follower 52 can engage both members 22 and 23 and be prevented from member rocking transversely about member 22. This will assure that the corresponding lower pulley 56 will not move transversely and into the path of rotation of the spokes of rear wheel 16.

A further improvement can reside in the use of a Sturmy Archer hub for pulley 70 on each of the crank arms 28 and 30. This will increase the efficiency of operation of the mechanism of FIGS. 1, 3 and 6. Also, each element 74 on the hub of rear wheel 16 can be a pulley whose width allows chain 58 to be wrapped a number times around it to increase the frictional force therebetween.

Figure 8:
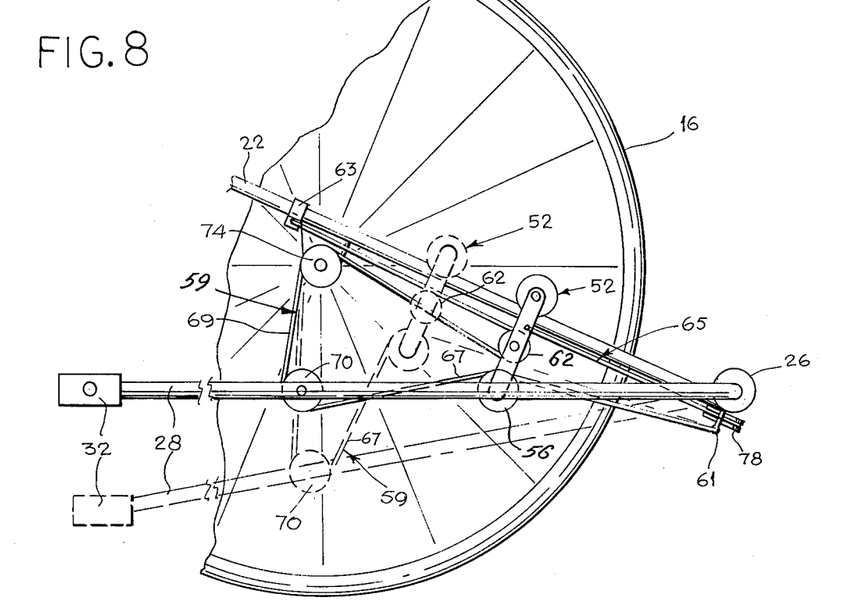
FIG. 8 is a view similar to FIG. 6 but showing another embodiment of the chain control unit.

The first embodiment shown in FIGS. 1–6 is generally provided for average bicycle use where initial leg forces are desirably not great. A second embodiment of the chain control unit of this invention is shown in FIG. 8 and is adapted for use by cyclists who have stronger legs, such as racers or the like. To this end, the second embodiment operates without any delay in the movement of each follower member during initial downward movement of the corresponding crank arm. Thus, each follower member 52 moves when its corresponding crank arm moves, even when the crank arm is at its highest position and commences to move downwardly.

Follower member 52 for crank arm 28 is illustrated in FIG. 8 wherein the chain arrangement is different from that shown in the first embodiment of FIGS. 1–6. A chain 59 is secured at one end to a lug 61 on tube 26. Chain 59 passes over the lower roller 56 of the corresponding follower 52, then down around the corresponding sprocket 70 of crank arm 28, then up and around hub sprocket 74 on rear wheel 16, then around cylindrical link 62 extending between side strips 60 of follower member 52, then forwardly and to a lug 63 rigidly secured to the corresponding frame member 22. A second chain 65 is pivotally connected to follower member 52, such as to side strips 60 intermediate the ends thereof. Chain 65 passes rearwardly and about a pulley 78 rotatably mounted on the bottom of tube 26, then forwardly and connects with the other follower member 52 on the opposite frame member 22. There is a corresponding chain 59 associated with the other follower member 52 and this chain is coupled to respective sprockets associated with crank arm 30 in the same manner as that described with respect to crank arm 28.

For all downward travel of the corresponding crank arm, follower member 52 will immediately move forwardly along crank arm 28 because chain 59 is wrapped partially about link 62. As follower member 52 moves forwardly, stretch 67 of chain 59 will progressively approach stretch 69 of the same chain so that sprocket 74 will rotate at increased angular increments with uniform increment changes of crank arm 28. Thus, there will be a maximum rotation of sprocket 74 for each increment of angular travel of the corresponding crank arm, a condition to assure the maximum torque applied to rear wheel 16.

Both the first and second embodiments require much less effort at the top portion of travel of the crank arm and the legs develop lesser amounts of lactic acid which tires the rider. Thus, the use of the chain control units of the two embodiments renders bicycle 10 more efficient and it is estimated that such efficiency increase is about 15 percent. Moreover, such efficiency is attained because the increase in force required to continue to force each crank arm downwardly occurs when the corresponding leg is nearly straight, the condition at which the legs can deliver greater downward force.

Another embodiment of the chain control mechanism of this invention is illustrated in FIGS. 9–13, wherein a chain control unit of the overriding type is shown. To this end, a pair of followers 110 of the type similar to followers 52 are provided on respective frame members 22 of bicycle frame 12. Followers 110 have no connection to any chains as in the case of followers 52 described above. There is a chain 112 associated with each follower 110, respectively, but each chain 112 freely moves between the sides 114 (FIG. 10) of the corresponding follower 110. Each side 114 has a spring-biased plunger 116 in the form of a flat blade which is biased outwardly of the corresponding side but is movable inwardly against the bias force of its spring.

Figure 9:
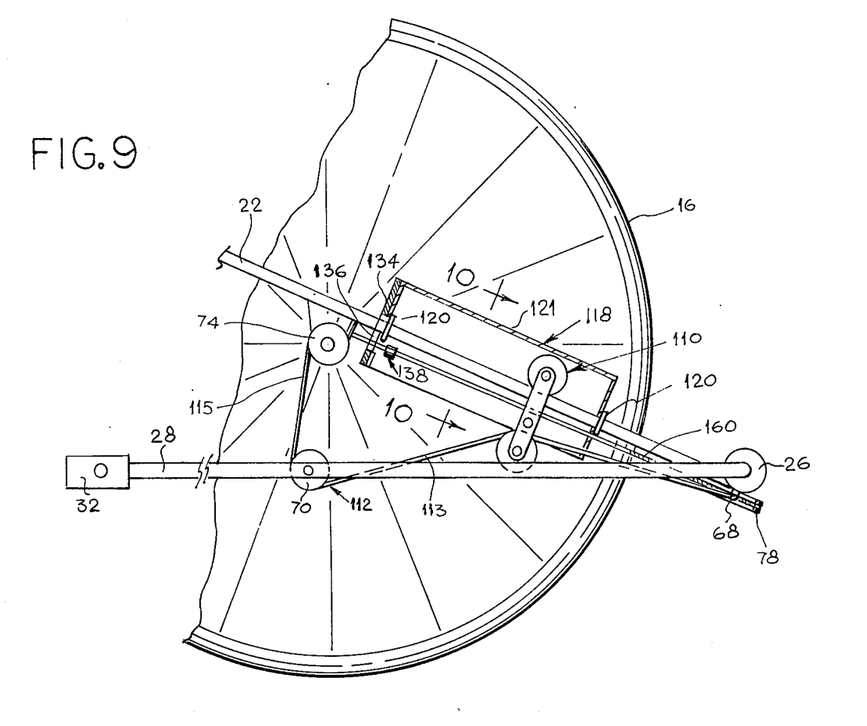
FIG. 9 is a view similar to FIGS. 6 and 8 but showing a third embodiment of the chain control unit.
Figure 10:
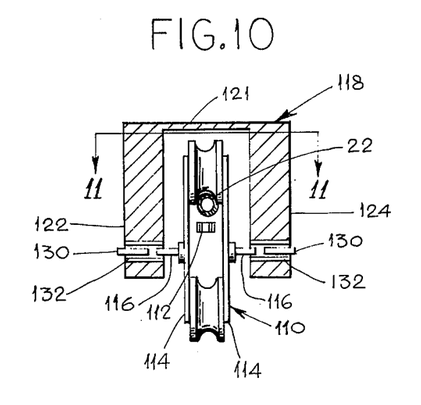
FIG. 10 is an enlarged, cross-sectional view taken along line 10—10 of FIG. 9.
Figure 11:
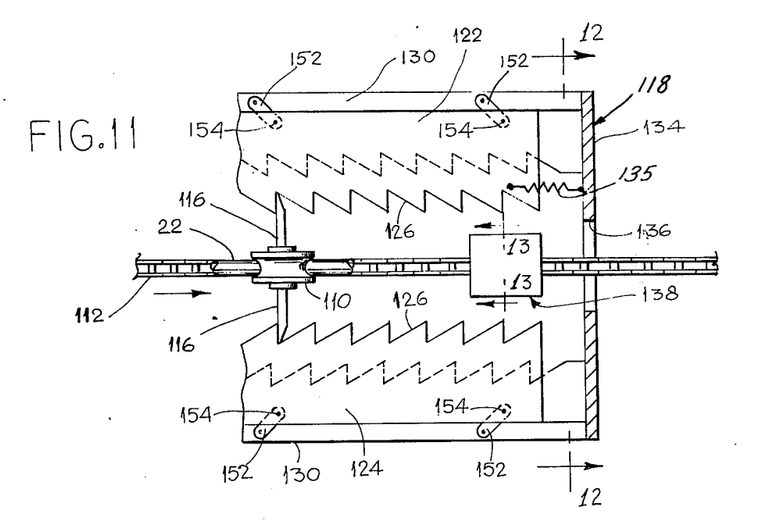
FIG. 11 is a cross-sectional view taken along line 11—11 of FIG. 10.

Each follower 110 is disposed within a hood or housing 118 having fasteners 120 at the front and rear ends thereof for attachment to the corresponding frame member 22. Housing 118 has a top 121 and a pair of opposed sides 122 and 124 (FIGS. 10 and 11). Each side has a sawtooth inner surface as shown in FIG. 11 to present a plurality of notches or recesses 126 for removably receiving plungers 116 of the corresponding follower 110 in the manner shown in FIG. 11. Thus, with plungers 116 in a pair of corresponding recess 126, the follower will be at a given position spaced from sprockets 70 and 74 on the corresponding crank arm 28 and rear wheel hub, respectively. Thus, the position of each follower 110 will determine the angular relationship between stretches 113 and 115 (FIG. 9) of chain 112. This is an important relationship because, as stretch 113 approaches stretch 115, there will be a greater rotation of pulley 74 for each continued incremental, angular, downward movement of the corresponding crank arm, such as arm 28 of FIG. 9.

Figure 12:
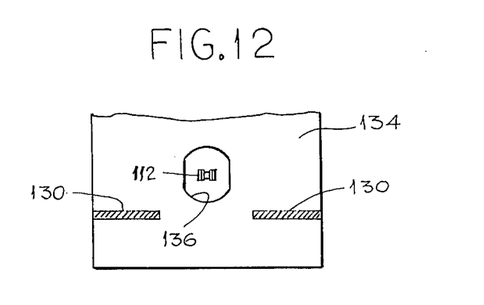
FIG. 12 is a cross-sectional view taken along line 12—12 of FIG. 11.
Figure 13:
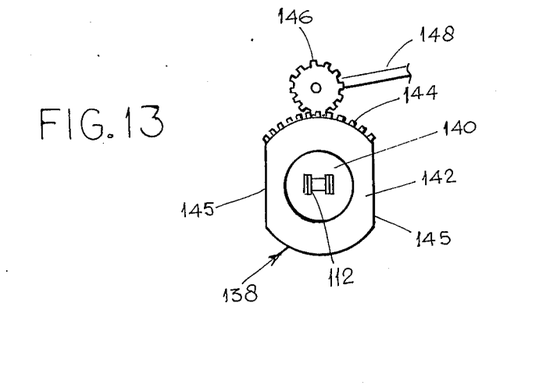
FIG. 13 is an enlarged, cross-sectional view taken along line 13—13 of FIG. 11.
Figure 14:
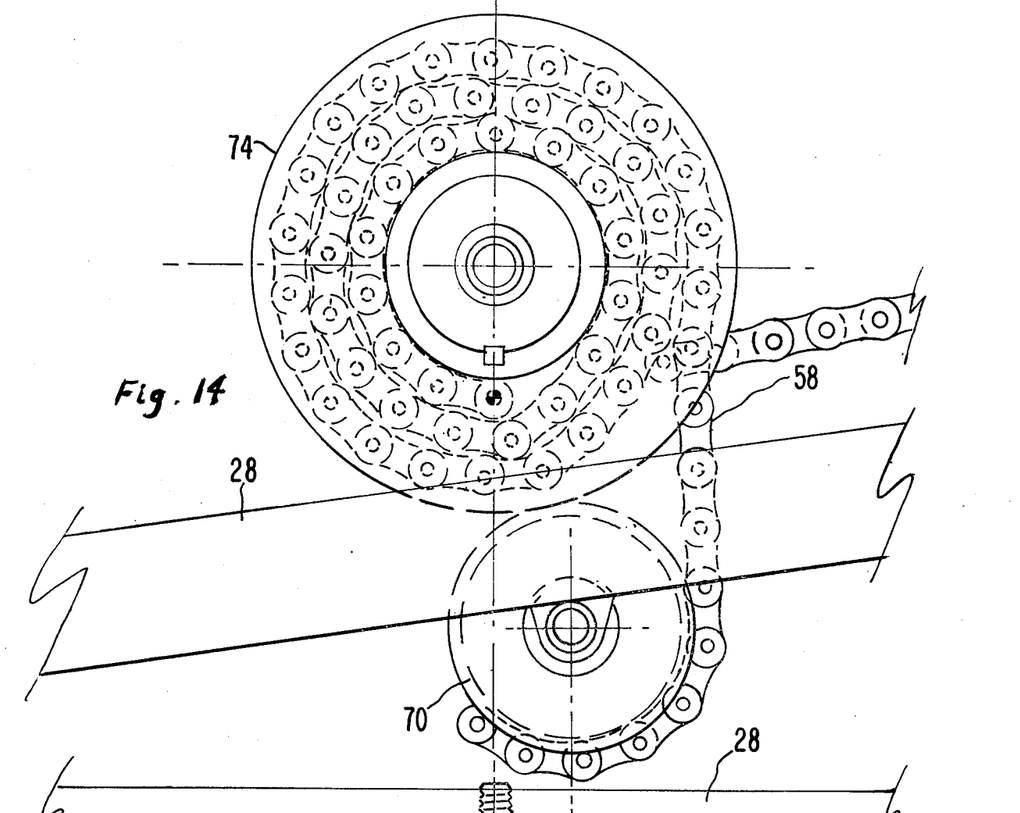
FIG. 14 is an enlarged, fragmentary, side elevational view of the embodiment of FIGS. 1–6.
Figure 15:
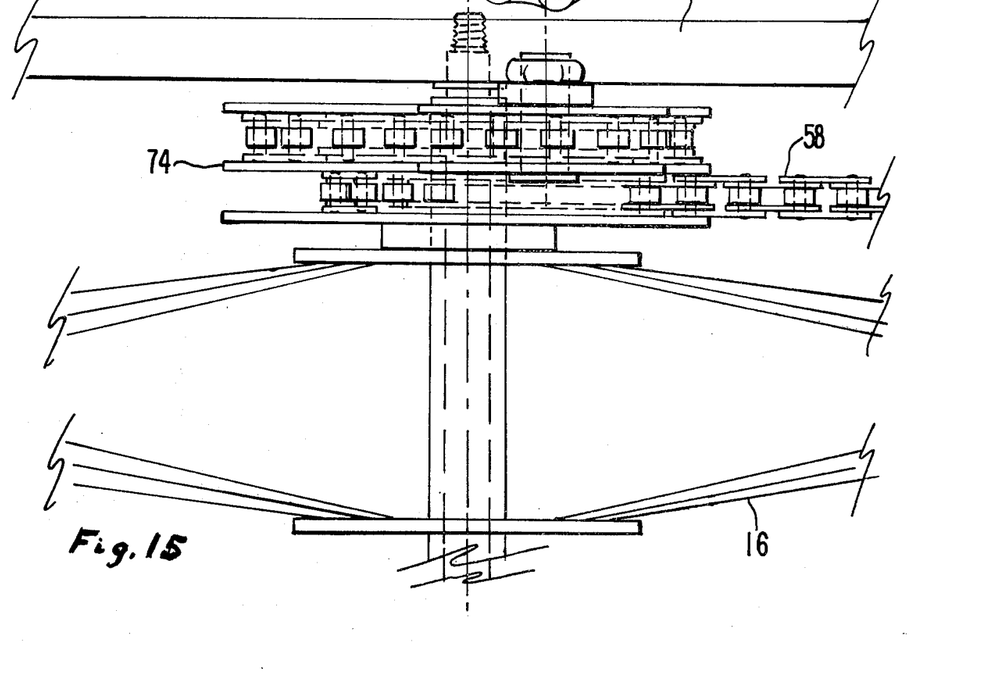
FIG. 15 is an enlarged, fragmentary, top plan view of the structure of FIG. 14.

To advance each follower 110 along its corresponding frame member 22, the corresponding plungers 116 are progressively advanced in successive recesses 126. This is accomplished by a pair of rigid strips 130 provided in slots 132 (FIG. 10) through sides 122 and 124 of housing 118, the slots being perpendicular to the sides. Strips 130 are rigidly coupled at respective ends to a front plate 134 having a hole 136 therethrough which is curved at the top and bottom portions thereof and has straight sides as shown in FIG. 12. Chain 112 passes freely through hole 136. The chain carries an actuator 138 thereon within housing 118 as shown in FIG. 9. Actuator 138 has an inner portion 140 attached to the chain and an outer portion 142 rotatably mounted on inner portion 140. A curved rack 144 is secured to the outer surface of upper portion 142 and meshes with an elongated, rotatable pinion 146 having a cable 148 attached thereto in a manner such that, as the cable is shifted longitudinally it causes rotation of the pinion and thereby rotation of outer portion 142 relative to inner portion 140 of actuator 138. The cable extends to a pushbutton (not shown) mounted on handlebars 38 so that, when the pushbutton is depressed, cable 148 is moved longitudinally.

Outer portion 142 of actuator 138 has the same configuration as hole 136. Thus, in its normal position, outer portion 142 can freely pass through hole 136 and there is no movement of plate 134 relative to housing 118. Thus, strips 130 remain stationary as chain 112 moves in the direction of arrow 150 (FIG. 11) relative to housing 118 under the influence of the downward movement of the corresponding crank arm.

If the pushbutton on the handlebar is depressed, it will cause rotation of pinion 146 to, in turn, cause rotation of outer portion 142 relative to inner portion 140 of actuator 138. This will cause the flats 145 on the outer surface of outer portion 142 to be out of alignment with the straight sides of hole 136. Thus, actuator 138 cannot pass through hole 136 as the actuator moves with chain 112. This will cause actuator 138 to abut the inner face of plate 134 to force it forwardly relative to housing 118. Movement of plate 134 will carry strips forwardly. However, the strips will not only move forwardly but also inwardly toward each other because they have angled inclined slots 152 therethrough which receive pins 154 carried by sides 122 and 124 as shown in FIG. 11. These angled slots, therefore, cause a sawtooth configuration on the inner margin of each strip 130 to move along an inclined path. One of the teeth on each strip 130 will engage the corresponding plunger 116 and force it inwardly and at the same time advance it forwardly relative to housing 118. The distance travelled by each strip 130 for each complete stroke of the corresponding crank arm will be sufficient to advance each plunger 116 by the distance equal to the space between a pair of adjacent sawteeth on housing 118.

As the crank arm reaches its lowest position and then starts upwardly, plate 134 and the corresponding strips 130 reverse by the action of a spring 135 coupled between plate 134 and housing 118. When this occurs, plungers 116 of the corresponding follower 110 are free to move outwardly under the bias forces of their springs and into the aligned recesses 126 adjacent thereto. The plungers will remain there until they are next advanced by the corresponding strips 130. Next advancement will occur during the next complete stroke of the corresponding crank arm and while the aforesaid pushbutton continues to be depressed. Thus, the advancement of followers 110 can occur as a function of the up and down movements of the crank arms so long as the pushbutton on the handlebar is depressed.

To return the followers to their initial starting positions, strips (not shown) similar to strips 130 and operated by a second pushbutton on the handlebars can be provided on housing 128 to force plungers 116 inwardly long enough to allow followers 110 to move by gravity along respective frame members 22 to the rear ends of respective housings 118. Also, to return the crank arms to their upper positions after being forced downwardly, a spring 160 is secured to the rear ends of each chain 112 as shown in FIG. 9, the spring passing around pulley 78 on the bottom of tube 26.

I claim:

1. In a bicycle of the type having a frame provided with a pair of spaced, elongated frame members disposed alongside and extending to a location behind a wheel having a hub mounted on and disposed between the frame members, a drive control unit comprising: a pair of crank arms; means coupled with the crank arms for mounting the same on said frame members at the rear ends of the latter for up and down movement along respective paths with the crank arms extending longitudinally of the frame members, alongside the wheel and forwardly of the wheel hub; an elongated, flexible drive means; a pair of drive elements carried on said wheel hub at the opposite sides thereof, said drive means having a pair of side portions extending longitudinally of said frame members and coupled with respective drive elements to alternately rotate the same in one direction as said side portions of said drive means alternately move in said one direction, said side portions of said drive means being coupled with respective crank arms and being moved thereby in said one direction as said crank arms alternately move in one sense relative to the rear ends of said frame members; and a follower adapted to be shiftably carried by each frame member, respectively, each side portion of said drive means having a first stretch extending from the corresponding drive element to the corresponding crank arm and a second stretch extending from the corresponding crank arm to the corresponding follower, each follower being operable to change the angular relationship between the corresponding stretches to thereby effect a change in the torque applied to the hub as a function of the movement of the corresponding crank arm in said one sense.

2. In a bicycle as set forth in claim 1, wherein said drive means is directly coupled with each follower, respectively, whereby each follower will be moved relative to the corresponding frame member for all movements of the corresponding crank arm.

3. In a bicycle as set forth in claim 1, wherein said frame has a second frame member for each of the first-mentioned frame members, respectively, each second frame member being parallel with and spaced from the corresponding first frame member, each follower including a roller movable between and normally engaging the corresponding first and second frame member.

4. In a bicycle as set forth in claim 1, wherein said drive means comprises a chain, each drive element comprises a sprocket, said crank arm mounting means having a rotatable member thereon, said chain extending partially about said rotatable member.

5. In a bicycle as set forth in claim 1, wherein each drive element has a width sufficient to permit said drive means to be wrapped several times about the same.

6. In a bicycle as set forth in claim 1, wherein said crank arm mounting means includes a gear unit interconnecting the crank arms to assure movement of one of the crank arms in a first sense as the other arm moves in the opposite sense.

7. A bicycle comprising: a frame provided with a pair of spaced, elongated rear frame members; a front wheel; means mounting the front wheel on the frame for rotation relative thereto; a rear wheel having a hub rotatably mounted on and disposed between the frame members, the latter extending to a location rearwardly of the rear wheel; a pair of crank arms; means coupled with the crank arms for mounting the same on said rear frame members at the rear ends of the latter for up and down pivotal movement with the crank arms extending longitudinally of said frame members, alongside the rear wheel, and forwardly of the rear wheel hub; an elongated, flexible drive means; a pair of drive elements carried on said rear wheel hub at the opposite sides thereof, said drive means having a pair of side portions extending longitudinally of said frame members and coupled with respective drive elements to alternately rotate the same in one direction as said side portions of said drive means alternately move in said direction; an idler element on each crank arm, respectively, intermediate the ends thereof, said side portions of said drive means being coupled with respective idler elements, extending rearwardly thereof, and being moved thereby in said direction as said crank arms move in one sense relative to the rear ends of the frame members; and a follower shiftably carried by each frame member, respectively, each side portion of said drive means having a first stretch extending from the corresponding drive element to the corresponding idler element and a second stretch extending from the corresponding idler element to the corresponding follower, each follower being operable to change the angular relationship between the corresponding stretches to thereby effect a change in the torque applied to the hub as a function of the displacement of the corresponding crank arm.

8. A bicycle as set forth in claim 7, wherein said drive means includes a single drive member having a pair of opposed ends secured to said crank arm mounting means, there being a rotatable device carried by said crank arm mounting means, said drive member being coupled with said device and extending forwardly therefrom along respective frame members to define said side portions.

9. A bicycle as set forth in claim 7, wherein said drive means includes a pair of flexible drive members and a flexible drive element, each drive member having one end coupled to said crank arm mounting means and to the corresponding frame member adjacent to said rear wheel hub, with the drive member being directly coupled to the corresponding follower, said crank arm mounting means having a rotatable device, said drive element being coupled at its ends to said followers and extending about said device.

10. In a bicycle as set forth in claim 7, wherein said frame members are inclined and extending rearwardly of said wheel, each follower including an upper roller normally engaging and being movable along the corresponding frame member, and a lower roller spaced below the upper roller, said drive means extending over and being movable relative to said lower roller.

11. A bicycle as set forth in claim 7, wherein each follower has an extension thereon with a hole therethrough, said drive means having a lost motion portion extending through the hole to permit movement of the follower only after said portion has moved through said hole, whereby said angular relationship will change only when said drive means has moved through a distance equal to the length of said lost motion portion.

12. In a bicycle as set forth in claim 7, wherein said drive means is directly coupled with each follower, respectively, whereby each follower will be moved relative to the corresponding frame member for all movements of the corresponding crank arm.

13. In a bicycle as set forth in claim 7, wherein each follower is normally independent of said drive means and wherein is provided override means coupled with each follower, respectively, for releasably coupling the drive means thereto to cause movement of the follower along the corresponding frame member in response to movements of the corresponding crank arm in said one sense.

14. In a bicycle of the type having a frame provided with a pair of spaced, elongated, inclined frame members and a wheel having a hub mounted on and disposed between the frame members with the frame members extending away from the hub of the wheel, a drive control unit comprising: a pair of crank arms; means coupled with the crank arms for mounting the same on said frame members at proximal ends of the latter for up and down movement along respective paths with the crank arms extending longitudinally of the frame members; an elongated, flexible drive member; a pair of drive elements carried on said wheel hub at the opposite sides thereof, said drive member having a pair of side portions extending longitudinally of said frame members and coupled with respective drive elements to alternately rotate the same in one direction as said side portions of said drive member alternately move in said one direction, said side portions of said drive member being coupled with respective crank arms and being moved thereby in said one direction as said crank arms alternately move in one sense relative to the frame; and a follower for each frame member, respectively, each follower including an upper roller normally engaging and being movable along the corresponding frame member, and a lower roller below the upper roller, each side portion of said drive member having a first stretch extending from the corresponding drive element to the corresponding crank arm and a second stretch extending from the corresponding crank arm to and over the corresponding lower roller and being movable relative thereto, each follower being operable to change the angular relationship between the corresponding stretches to thereby effect a change in the torque applied to the hub as a function of the movement of the corresponding crank arm in said one sense.

15. In a bicycle of the type having a frame provided with a pair of spaced, elongated frame members and a wheel having a hub mounted on and disposed between the frame members, a drive control unit comprising: a pair of crank arms; means coupled with the crank arms for mounting the same on said frame members at proximal ends of the latter for up and down movement along respective paths with the crank arms extending longitudinally of the frame members; an elongated, flexible drive member; a pair of drive elements carried on said wheel hub at the opposite sides thereof, said drive member having a pair of side portions extending longitudinally of said frame members and coupled with respective drive elements to alternately rotate the same in one direction as said side portions of said drive member alternately move in said one direction, said side portions of said drive member being coupled with respective crank arms and being moved thereby in said one direction as said crank arms alternately move in one sense relative to the frame; and a follower shiftably carried by each frame member, respectively, each side portion of said drive member having a first stretch extending from the corresponding drive element to the corresponding crank arm and a second stretch extending from the corresponding crank arm to the corresponding follower, each follower being operable to change the angular relationship between the corresponding stretches to thereby effect a change in the torque applied to the hub as a function of the movement of the corresponding crank arm in said one sense, each follower having an extension thereon with a hole therethrough, said drive member having a lost motion portion extending through the hole to permit movement of the follower only after said portion has moved through said hole, whereby said angular relationship will change only when said drive member has moved through a distance equal to the length of said lost motion portion.

16. In a bicycle of the type having a frame provided with a pair of spaced, elongated frame members and a wheel having a hub mounted on and disposed between the frame members, a drive control unit comprising: a pair of crank arms; means coupled with the crank arms for mounting the same on said frame members at proximal ends of the latter for up and down movement along respective paths with the crank arms extending longitudinally of the frame members; an elongated, flexible drive member; a pair of drive elements carried on said wheel hub at the opposite sides thereof, said drive member having a pair of side portions extending longitudinally of said frame members and coupled with respective drive elements to alternately rotate the same in one direction as said side portions of said drive member alternately move in said one direction, said side portions of said drive member being coupled with respective crank arms and being moved thereby in said one direction as said crank arms alternately move in one sense relative to the frame; a follower shiftably carried by each frame member, respectively, each side portion of said drive member having a first stretch extending from the corresponding drive element to the corresponding crank arm and a second stretch extending from the corresponding crank arm to the corresponding follower, each follower being normally independent of said drive member; and override means coupled with each follower, respectively, for releasably coupling the drive member thereto to cause movement of the follower along the corresponding frame member in response to movements of the corresponding crank arm in said one sense, each follower being operable to change the angular relationship between the corresponding stretches to thereby effect a change in the torque applied to the hub as a function of the movement of the corresponding crank arm in said one sense.

17. In a bicycle as set forth in claim 16, wherein said override means includes a housing for each follower, respectively, each housing having a pair of opposed sides, each side having a sawtooth inner surface to present a plurality of notches, each follower having a pair of opposed, spring-biased plungers for entering aligned notches on the sides of the corresponding housing, and means selectively coupling the drive means to said housing to cause the corresponding follower to advance along the adjacent frame member to change said angular relationship.

* * * * *